US010505736B1

(12) United States Patent
Meixler (10) Patent No.: US 10,505,736 B1
(45) Date of Patent: Dec. 10, 2019

(54) REMOTE CYBER SECURITY VALIDATION SYSTEM

(71) Applicant: Michael A Meixler, New Hope, PA (US)

(72) Inventor: Michael A Meixler, New Hope, PA (US)

(73) Assignee: Meixler Technologies, Inc., New Hope, PA (US)

( * ) Notice: Subject to any disclaimer, the term of this patent is extended or adjusted under 35 U.S.C. 154(b) by 0 days.

(21) Appl. No.: 16/046,044

(22) Filed: Jul. 26, 2018

(51) Int. Cl.
*H04L 29/06* (2006.01)
*H04L 9/32* (2006.01)
*G06F 12/14* (2006.01)

(52) U.S. Cl.
CPC .......... *H04L 9/3226* (2013.01); *H04L 9/3236* (2013.01); *H04L 9/3247* (2013.01); *H04L 63/123* (2013.01)

(58) Field of Classification Search
CPC ... H04L 9/3226; H04L 9/3236; H04L 63/123; H04L 9/3247
USPC ............................ 713/188, 165, 168; 726/24
See application file for complete search history.

(56) References Cited

U.S. PATENT DOCUMENTS

| | | | | |
|---|---|---|---|---|
| 6,314,451 B1 * | 11/2001 | Landsman | ............. | G06Q 30/02 709/203 |
| 6,418,472 B1 * | 7/2002 | Mi | ..................... | G06F 21/6218 709/202 |
| 7,565,543 B1 * | 7/2009 | Mungale | ................. | G06F 21/31 713/176 |
| 9,635,041 B1 * | 4/2017 | Warman | ................... | H04L 41/50 |
| 2007/0174915 A1 * | 7/2007 | Gribble | .................... | G06F 21/53 726/24 |
| 2007/0192854 A1 * | 8/2007 | Kelley | ..................... | G06F 21/53 726/22 |
| 2009/0287931 A1 * | 11/2009 | Kinsella | ................. | G06F 21/64 713/175 |
| 2011/0016169 A1 * | 1/2011 | Cahill | ..................... | G06F 21/54 709/203 |
| 2012/0198234 A1 * | 8/2012 | Chung | .................. | H04L 9/3247 713/171 |
| 2013/0262851 A1 * | 10/2013 | Hirvonen | .............. | H04L 63/123 713/150 |
| 2015/0195253 A1 * | 7/2015 | Ander | ................. | H04L 63/0281 726/12 |
| 2016/0294561 A1 * | 10/2016 | Base | ....................... | G06F 21/64 |

(Continued)

*Primary Examiner* — Aravind K Moorthy
(74) *Attorney, Agent, or Firm* — Richards Patent Law, P.C.

(57) ABSTRACT

A method of verifying the integrity of a downloadable file comprising the steps of requesting a download of a file via a download requesting device comprising an electronic device including a web browsing application through which the download is requested and a web-browser memory; downloading the file into the web-browser memory while preventing the file from being opened or executed by the download requesting device; within the web browsing application, analyzing the file to derive a cryptographic value of the file; within the web browsing application, comparing the derived cryptographic value of the file with a reference value associated with the file that is stored in a memory accessible by the web browsing application; and only when the derived cryptographic value of the file matches the reference value associated with the file, enabling the file to be opened, saved, or executed by the download requesting device.

18 Claims, 7 Drawing Sheets

(56) References Cited

U.S. PATENT DOCUMENTS

| | | | |
|---|---|---|---|
| 2017/0193464 A1* | 7/2017 | Sher | G06Q 20/065 |
| 2018/0018468 A1* | 1/2018 | Williams | G06F 21/602 |
| 2018/0124007 A1* | 5/2018 | Ploch | H04L 51/22 |
| 2018/0205554 A1* | 7/2018 | Blinn | H04L 9/3247 |
| 2019/0306248 A1* | 10/2019 | Swarangi | H04L 67/14 |

* cited by examiner

REMOTE CYBER SECURITY VALIDATION SYSTEM

BACKGROUND OF THE INVENTION

The present invention relates to the field of cyber security. More specifically, the present disclosure describes a system which automatically validates file downloads, web pages, etc. utilizing file hashes and other cryptographic values.

It is common for organizations to make files available for download to end users. Sometimes these files are available through a website operated by an organization. Other times these files are available through third-party websites. For example, the United States Treasury makes numerous tax forms and publications available for download through its website. Similarly, technology companies often make software programs and updates available to their customers as downloadable files from the company's website. Other downloadable files, such as freeware, may be found at the given software developer's site, but may also be found on one or more repositories of freeware available on the Internet.

After downloading a file from a website, the user's web browser typically gives the user the option to either open the file or save the file to their local system. One skilled in the art may immediately recognize the inherent security risk—execution of a malicious file may corrupt a user's device.

As a security measure, a cryptographic hash of the file is often published on the organization's website, so that the user can verify the integrity of the file, after downloading it, by confirming that the actual hash of the file downloaded matches the hash published on the site. For instance, computer manufacturers such as Dell, Hewlett Packard, Apple, etc. make numerous updates, drivers, and other types of files available to their customers to download from their web sites. Near the links to download these files, these manufacturers typically publish cryptographic hashes corresponding to these files. These hashes are typically calculated using a hashing algorithm such as MD5, SHA1, SHA256, SHA512, or another standard hashing algorithm.

While this process is very effective for verifying the integrity of files, it is often not utilized. Many users do not understand the process and may not have the tools or the know-how to apply it. Even users that do understand how to apply the process may find it too cumbersome or inefficient and opt not to apply it. However, failure to apply this process can result in a costly outcome if the file has been tampered with by a malicious actor. Such outcomes do not only carry monetary cost but also pose threats to local and national security as well as potentially revealing sensitive personal information.

As noted above, the fact that users are typically given the option to open downloadable files directly from their hosted location is a security risk. Accordingly, there is a need for an automated cybersecurity system which utilizes file hashes and other cryptographic values to verify the integrity of a downloadable file prior to enabling a user to execute the file.

BRIEF SUMMARY OF THE INVENTION

To meet the needs described above and others, the present disclosure describes a cybersecurity system which utilizes file hashes to validate file downloads, webpages, etc. prior to being saved, opened, or executed on the end user's device. Accordingly, the integrity of the file is validated prior to it being a threat to a user's device onto which it may be downloaded or within which it may be executed.

In one embodiment of the present invention, a short JavaScript program is incorporated into a web page to enable a user to safely download a file from a remote location. When a user requests to download a file from the web page, the program automatically executes to ensure the integrity of the file before the user is able to access it via the end user device. In a preferred embodiment of the program, the program receives as inputs: (i) the name of the file; (ii) the URL from where the file is to be downloaded; and (iii) the expected hash of the file. These inputs are provided to the program automatically from the web page, without involvement by the user. The program downloads the file into temporary memory from the URL, then derives the hash of the file. If, and only if, the actual hash of the file matches the expected hash of the file, the program makes the file available to the user to open, save, or execute. If the actual hash of the file does not match the expected hash of the file, the user is alerted that the file may have been tampered with, and the file is not made available to the user.

In a second embodiment, the logic for verifying the integrity of a downloaded file implemented by way of programming embedded in the web browser or a web browser plug-in.

It is contemplated that hashes are not the only cryptographic operation that may be used for verifying the integrity of downloadable files, other cryptographic operations can be used to verify the integrity of a file or webpage. For example, digital signatures are another cryptographic operation that may be used in unison with or in place of file hashes. Digital signatures are mathematical schemes for presenting the authenticity of digital messages or documents and are commonly used for software distribution, financial transactions, contract management software, etc.

In yet other embodiments of the present invention, the systems and methods described above for use within a web browser are used in other end user programs. One notable use is in email clients. Email attachments, embedded photos, and other media rich message content are rife for transmittal of viruses and other malware. The present system acts as a barrier between an end user's device and these potentially harmful messages, validating each email and/or attachment before allowing it to be downloaded through the end user's email client.

The system can also be used to verify the integrity of a web page before the web page is opened in the user's web browser. For example, if an end user is sent a suspicious link, the user can verify the integrity of the web page via the system to check that the web page's hash, digital signature(s), digital certificate(s), etc. all check out before directly loading the web page through the end user device. Likewise, a trusted web page could be used to vouch for the integrity of another web page via this method.

A goal of the present invention is to prevent hackers, foreign governments, or anyone else from disseminating files, web pages, emails, etc. that contain harmful or misleading content. The use of file hashes, block chain technology, and other digital verification methods as described herein are nearly impossible to break in modern computing. However, many end users forgo such verification as it can be cumbersome and also require some technological knowledge lay persons lack. These lay persons may even be unaware of the existence of file hash data or other methods which currently exist to ensure files, webpages, and other data have not been tampered with. The present system enables such verification to take place automatically and in an isolated environment which prevents many cybersecurity attacks from occurring.

An advantage of the present invention is that the verification of a file, web page, etc. takes place in isolation from the user's sensitive data. This means that when an end user choses, for example, to download an updated device driver in the form of an executable file, the file is actually downloaded to temporary memory and/or a remote server first with the system verifying the file's hash data based off a reference hash provided by the software provider (e.g., Dell, Apple, etc.). If the file hashes match, the end user is then able to save, open, or execute the file. If the hash is not verified, the system informs the end user and purges the unverified file from its memory. Thus, the present system acts as an additional layer of protection for the end user.

Another advantage of the present invention is that it automates an important but often bypassed task. Many different forms of cybersecurity verification exist. From digital signatures, to file hashes, to blockchain verification, many steps can be taken to verify digital information. However, it would be extremely impractical to conduct multiple stages of manual verification upon a single file download (e.g., check hashes and digital signatures) as the time requirement to do so would greatly hamper the usefulness of digital content distribution. The present system performs these verifications seamlessly behind the scenes, with end users being provided an easy to understand interface which prevents confusion.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
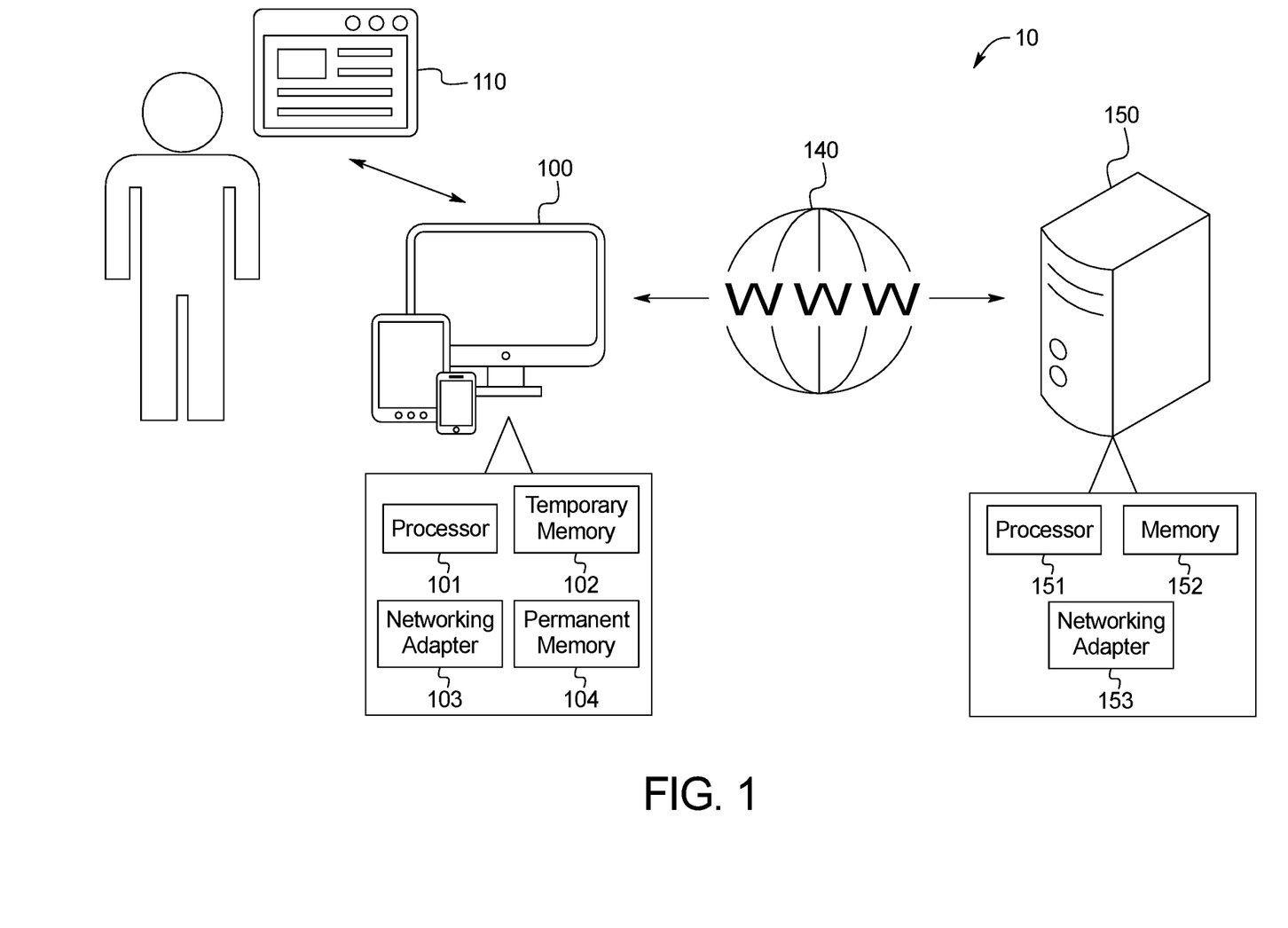
FIG. 1 is an overview diagram of a remote validation cybersecurity system.

FIG. 1 is an overview diagram of a remote validation cybersecurity system 10. As shown in FIG. 1, an end user may access a web browser 110 via their end user device 100 (e.g., desktop computer, laptop, smartphone, tablet, etc.). From the web browser 110 they may browse the internet 140 as normal, with the end user device 100 making contact with various external servers 150 which host websites, file shares, etc. When an end user elects to download digital content (e.g., an image file, a webpage, an email, etc.) the remote validation cybersecurity system 10 in this embodiment first contacts the external server 150 which host the to-be-downloaded content. Communication with the external server 150 is carried out via the internet 140 in this example, with the internal, temporary memory (e.g., RAM) 102 of the end user device 100 acting as a sort of quarantine area for the downloaded digital content. The content is held remotely to the end user device(s) 100 long term memory (e.g., Hard Disk Drive) 104 until the content's hash information, digital signature(s), etc. are confirmed by the system 10. Holding the file remotely to the long-term memory 104 prevents malicious files and code from accessing or acting upon the end user device 100. The external server 150 may feature its own processor 151, memory 152, and networking adapter 153 which enable it to communicate and host file downloads. The memory of the external server 150 may feature the files to be downloaded and also one or more separate databases of corresponding hash values and other cryptographic values for the downloaded files, the database being accessible by the present system 10 for reference.

The end user device 100 may feature a processor 101, temporary memory 102, network adapter 103 and long-term memory 104, wherein the network adapter 103 is responsible for establishing and maintaining a connection with the internet via Wi-Fi, cellular signal, wired connection(s), etc. The end user device communicates with both the cybersecurity system's 10 internal components as well as external websites, exchange servers, file shares, etc. End users may activate the remote validation cybersecurity system 10 via inputs (received by the device's processor 101) or the system 10 may sit in residence within the end user's web browser or another application. By being in constant operation within a web browser, etc. the system 10 will be constantly active and monitoring end user activity for files, web pages, etc. which need to be validated prior to download and/or opening upon an end user device.

The validation is carried out by the end user device's 110 processor 101 and memory 102 with the validation information being obtained from any number of resources. One of the most useful methods to validate a file is to examine its hash data. A hash is a unique digital value that is generated according to a file's contents. If the file has been changed in any way, the hash value changes as well. File hashes are generated in accordance with several different standards and typically published by companies offering downloads. The present system 10 can obtain these reference hash values via data integration, data scraping, automated search functions, and/or via manual user input. No matter the method the reference hash value is obtained by the system 10, it is then compared with the hash of the downloaded file to confirm they match. If the two separately derived hash values match (the reference value provided by the content publisher and the value associated with the actual file downloaded) this means the content of the downloaded file must be the same and provide extra confidence in the validity of a download.

Other methods of validation could also be combined with or used in place of file hashes. Similar to file hashes, digital signatures can also be utilized to confirm the content of a file has not been changed but go a step further in that some digital signatures are actually unforgeable. The use of a Full Domain Hash (FDH) digital signature scheme is one notable example of a method of file validation that is purported to be unbreakable. Similar to the use of the more basic file hashes mentioned above, this method of cybersecurity validation also calls for the system 10 to download a file first to an intermediary (e.g., the temporary memory 102 of an end user device or the internal database 130 of the system 10 (see FIG. 3)) where the digital signature can be verified using the signer's public key.

It should also be noted that in the example above, the entire file is downloaded to the end user device's temporary memory 102. However, for large files and large-scale implementations of the present system 10, the download of an entire file may be impractical due to storage limitations and concerns around speed of validation (the need to, in essence, download the file twice). For these situations, the present system 10 may be configured to perform only a partial file download or download file metadata to the extent needed to validate the file; then allow the file to be fully downloaded by the end user. For example, a software publisher may create a small, readily downloaded file which is directly linked to the content of a larger file package to be downloaded to enable more efficient validation.

Figure 3:
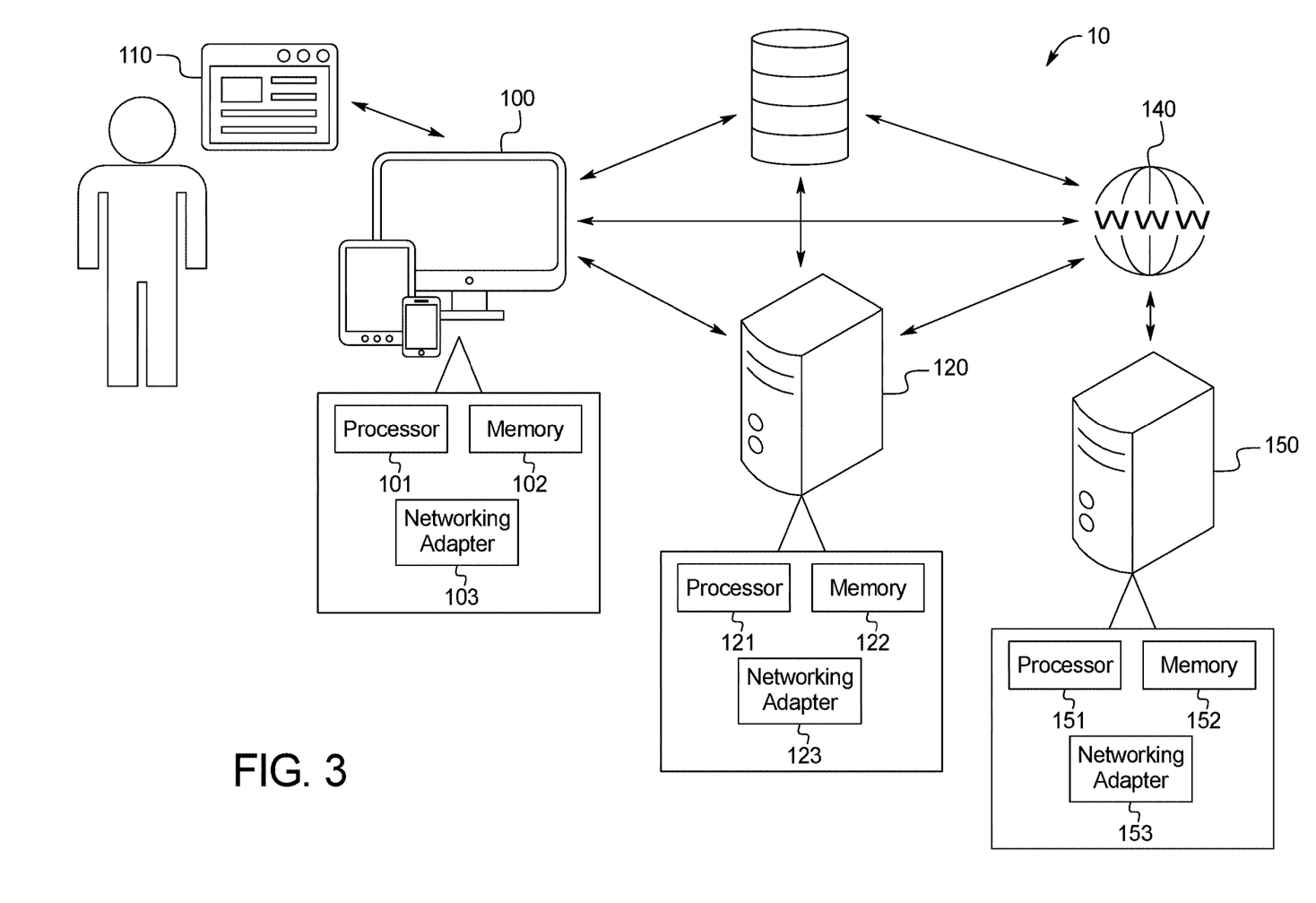
FIG. 3 is an overview diagram of a remote validation cybersecurity system featuring an intermediate server.

Alternatively, a file which exceeds the size of an end user device's RAM (temporary memory 102) may be downloaded in part to the end user device's temporary memory 102 with the rest being downloaded to an intermediate database 130 (see FIG. 3). In this way, the system 10 can validate files no matter their size.

Figure 2:
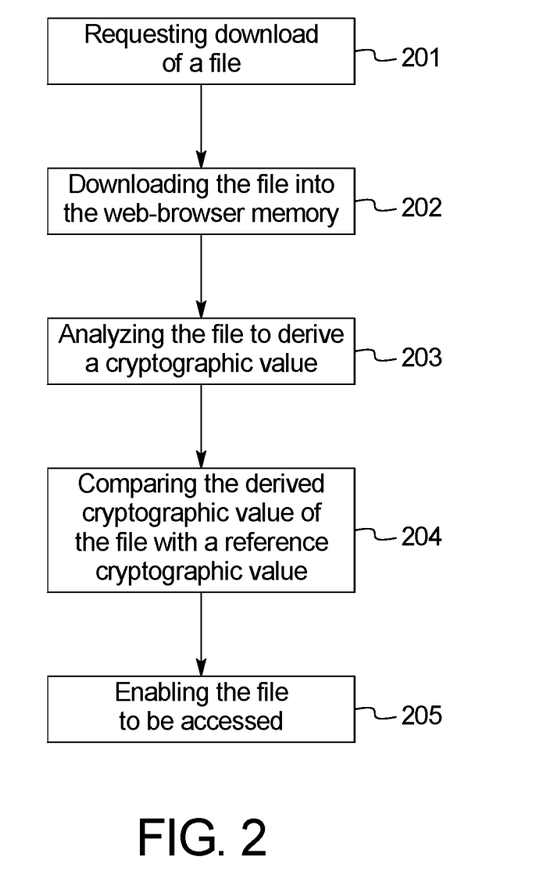
FIG. 2 is a flowchart which illustrates how a remote validation cybersecurity system validates a file download.

FIG. 2 is a flowchart which illustrates how a remote validation cybersecurity system 10 validates a file download. As shown in FIG. 2, at a first step 201 an end user requests the download of a file. The file to be downloaded may be any self-contained piece of information (e.g., an executable file, an email, web page, etc.) hosted on a website, web server, file server, etc. The request for download may be made via an end user device 100 with the system 10 then downloading all or part of the indicated file into the end user device's temporary memory 102 (step 202). Once download to the temporary memory 102 is complete, the system 10 then analyzes the file that was downloaded to determine its actual, current cryptographic values (step 203). Most cryptographic values are derived from the current actual content of a file which enables computerized systems to detect if the content of a given file has changed or not. The hash value of a given file is one such cryptographic value and, in this example, once the hash value or another cryptographic value for the downloaded file is derived by the system 10, it is then checked with a reference cryptographic value provided by the file download provider to ensure the file downloaded is the actual file provided by the content host (step 204). If the two cryptographic values provided match, the system 10 will then enable the end user to access the file on their end user device 100 (step 205).

FIG. 3 is an overview diagram of a remote validation cybersecurity system 10 featuring an intermediate server 120. As shown in FIG. 3, an end user may access a web browser 110 via their end user device 100 (e.g., desktop computer, laptop, smartphone, tablet, etc.). From the web browser 110 they may browse the internet 140 as normal, with the end user device 100 making contact with various external servers 150 which host websites, file shares, etc. via a processor 151, memory 152, and networking adapter 153. When an end user elects to download digital content (e.g., a file, a webpage, an email, etc.) the remote validation cybersecurity system 10 in this embodiment first contacts the external server 150 which host the to-be-downloaded content. Communication with the external server 150 is carried out by the system's 10 internal server 120, with the digital content downloaded to an internal database 130. This internal database 130 acts as a sort of quarantine area for the downloaded digital content, with the content being held remotely to the end user device(s) 100 in the internal database 130 until the content's hash information, digital signature(s), etc. are confirmed by the system 10.

The end user device 100 may feature a processor 101, memory 102, and network adapter 103, wherein the network adapter 103 is responsible for establishing and maintaining a connection with the internet via Wi-Fi, cellular signal, wired connection(s), etc. The end user device communicates with both the cybersecurity system's 10 internal components (e.g., internal server 120, internal database 130) as well as external websites, exchange servers, file shares, etc. End users may activate the remote validation cybersecurity system 10 via inputs (received by the device's processor 101 and memory 102) or the system 10 may sit in residence within the end user's web browser or another application. By being in constant operation within a web browser, etc. the system 10 will be constantly active and monitoring end user activity for files, web pages, etc. which need to be validated prior to download to an end user device.

For example, if an embodiment of the present system 10 was embedded as part of a web browser 110 (or a plug-in extension) it could monitor every web page an end user visits. When an end user visits a website containing file downloads, the system 10 (specifically its centralized server 120) will detect that the end user has the potential to download a file by examining the content of the given web page. Such analysis is performed by one or more functional portions of computer code stored in the centralized server's memory 122 and acted upon by the server's processor 121. The code, in this embodiment, directs the internal server 120 to act as a go-between for the end user device 100 and external server 150 when an end user elects to download a file. In this example, when the end user clicks upon a browsed webpage to download a file, the file to be downloaded is not immediately downloaded to the end user's device 100. Instead, the file is first downloaded by the internal server 120 to an internal database 130 where the system 10 validates the file. Once the file is validated, it can then be downloaded from the internal database 120 to the end user device 100.

The validation, in this example, is carried out by the internal server's 120 processor 121 and memory 122 with the validation information being obtained from any number of resources. One of the most useful methods to validate a file is to examine its hash data. A hash is an alphanumeric string that's generated according to a file's contents. If the file has been changed in any way, the hash value changes as well. File hashes are generated in accordance with several different standards and typically published by companies offering downloads. The present system can obtain these reference hash values via data integration, data scraping, automated search functions, and/or via manual user input. No matter the method the reference hash value is obtained by the system 10, it is then compared with the hash of the downloaded file to confirm they match. If the two separately derived hash values match (the reference value provided by the content publisher and the value associated with the actual file downloaded) this means the content of the downloaded file must be the same and provide extra confidence in the validity of a download.

Other methods of validation could also be combined with or used in place of file hashes. Similar to file hashes, digital signatures can also be utilized to confirm the content of a file has not been changed but go a step further in that some digital signatures are actually unforgeable. The use of a Full Domain Hash (FDH) digital signature scheme is one notable example of a method of file validation that is purported to be unbreakable. Similar to the use of the more basic file hashes mentioned above, this method of cybersecurity validation also calls for the system 10 to download a file first to an intermediary (e.g., the internal database 130) where the digital signature can be verified using the signer's public key.

Blockchain technology may also be utilized by the system 10 to verify the content of a file, web page, etc. Blockchain may function, for file validation, by keeping a public ledger of transactions which have occurred within a given file. The changes made to the file are all part of the blockchain record for a given file. This record is stored as a key which can be validated by a decentralized system of computers, wherein the key can be easily validated via mathematical calculation but is impossible to replicate. If the blockchain key for a file does not match what is present in the public ledger, the system 10 will detect this mismatch and prevent the end user from downloading a suspect file.

It should be noted the various system components shown are separated for ease of understanding and are fully realized as being potentially integrated into one physical device or a decentralized cloud-based system.

It should also be noted that in the example above, the entire file is downloaded to the internal database 130. However, for large files and large-scale implementations of the present system 10, the download of an entire file may be impractical due to storage limitations and concerns around speed of validation (the need to, in essence, download the file twice). For these situations, the present system 10 may be configured to perform only a partial file download or download file metadata to the extent needed to validate the file; then allow the file to be fully downloaded by the end user. For example, a software publisher may create a small, readily downloaded file which is directly linked to the content of a larger file package to be downloaded to enable more efficient validation.

Figure 4:
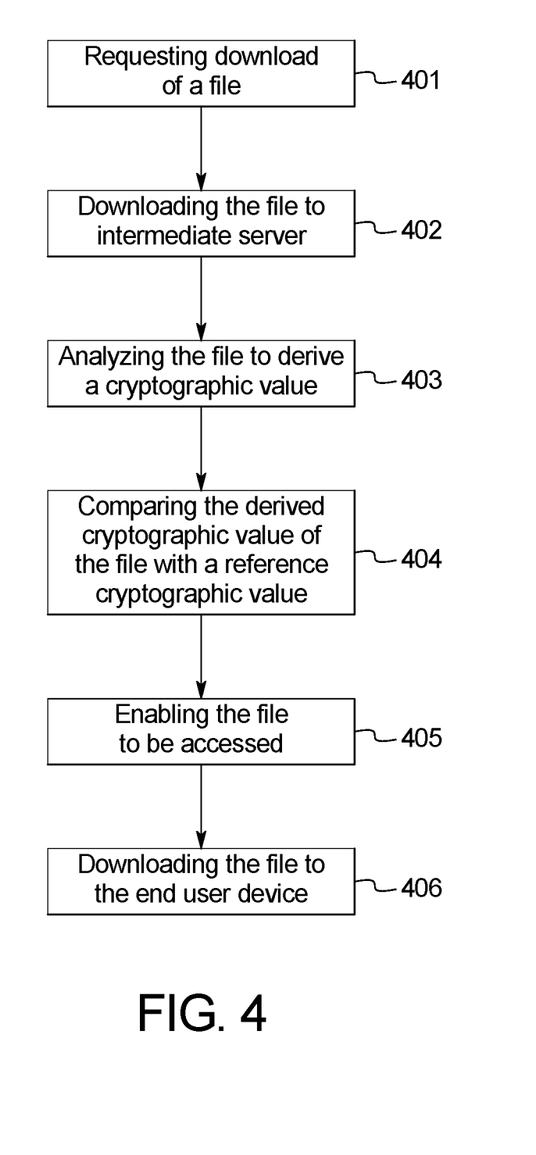
FIG. 4 is a flowchart which illustrates how a remote validation cybersecurity system validates a file download.

FIG. 4 is a flowchart which illustrates how a remote validation cybersecurity system 10 validates a file download. As shown in FIG. 4, at a first step 401 an end user requests the download of a file. The file to be downloaded may be any self-contained piece of information (e.g., an executable file, an email, web page, etc.) hosted on a website, web server, file server, etc. The request for download may be made via an end user device 100 with the system 10 then downloading all or part of the indicated file to an intermediate server 120 and database 130 (step 402). Once download to the intermediate database 130 is complete, the system 10 then analyzes the file that was downloaded to determine its actual, current cryptographic values (step 403). Most cryptographic values are derived from the current actual content of a file which enables computerized systems to detect if the content of a given file has changed or not. The hash value of a given file is one such cryptographic value and, in this example, once the hash value or another cryptographic value for the downloaded file is derived by the system 10, it is then check with a separate reference cryptographic value provided by the file download provider (external server 150) to ensure the file downloaded is the actual file provided by the content host (step 404). If the two cryptographic values provided match, the system 10 will then enable the end user to download the file to their end user device 100 (step 405). Download of the verified file is then enabled from the internal database 130 to the end user device 100.

It should be noted that the cryptographic value(s) provided for file verification can come from the file download provider, but also be sourced from other locations. One example of this could be a device driver for a personal computer running Microsoft Windows. The software company which created the device driver could provide the file download from their own file server, with a separate server hosted by Microsoft providing the file hash for verification. In this way, Microsoft could in essence but their "seal of approval" on third party software.

It should be noted that in ultra-secure settings, the verification steps mentioned above can be run in sequence so, the steps discussed in FIG. 2 could be coupled with the steps discussed in FIG. 4 to verify the cryptographic values associated with a file when downloaded from an external server 150 to the internal database 130 and then verified again when downloaded from the internal database 130 to the end user device 100.

Figure 5:
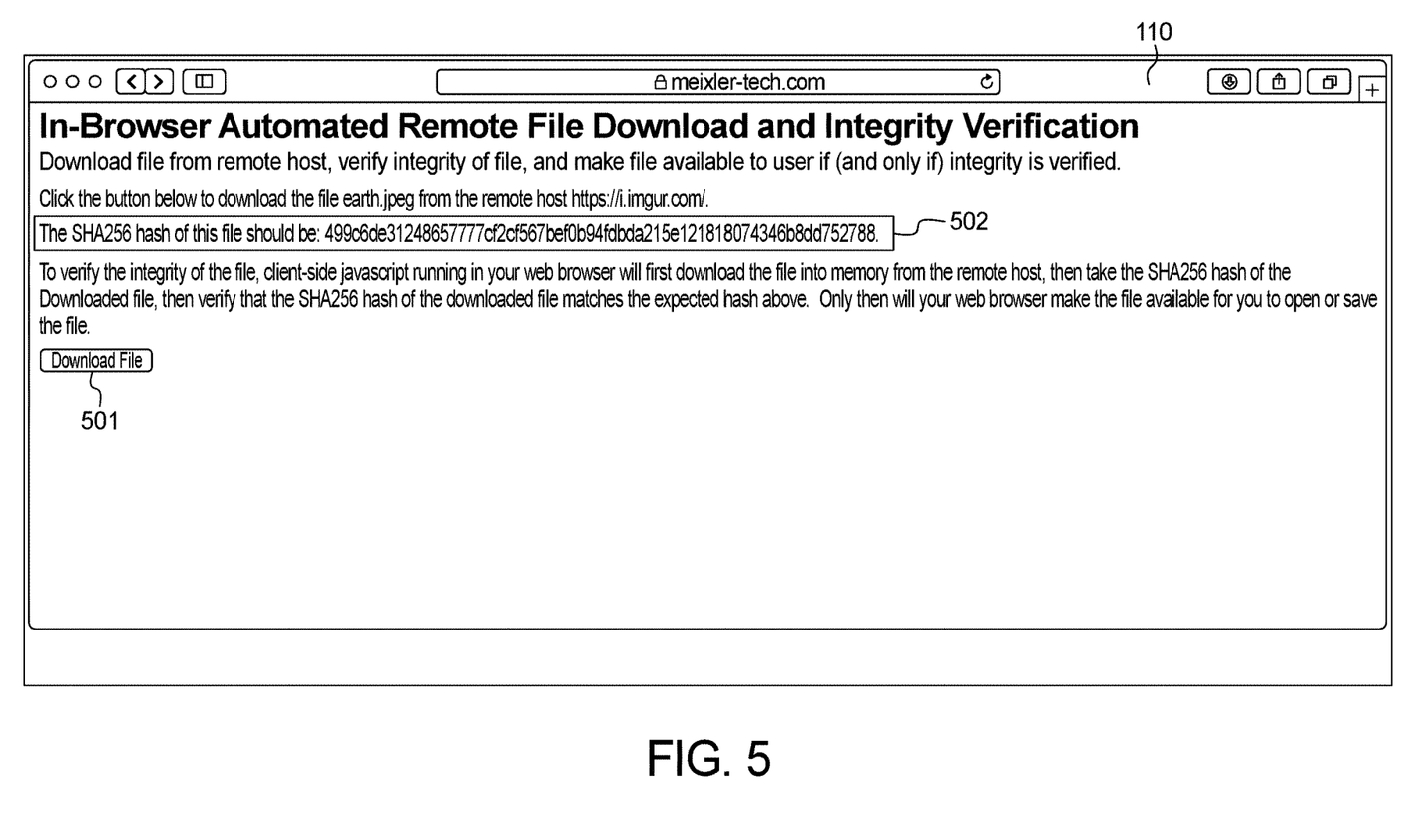
FIG. 5 is an initialization webpage of the remote validation cybersecurity system.

FIG. 5 is an initialization webpage of the remote validation cybersecurity system 10. As shown in FIG. 5, the remote validation cybersecurity system 10 may be integrated into the programming of a webpage or web browser 110. In this example, the webpage, loaded within the web browser 110, features JavaScript coding which downloads a file into the temporary memory 102 from a remote host (external server 150) and then verifies the file's cryptographic hash. To begin such a process, the end user may initialize the system 10 by clicking a button 501 to download the file from the remote, external server 150 to the temporary memory 102. The webpage also shows the cryptographic value 502, in this case a hash value, which is supposed to match what is derived by the system 10 for a given file. If the values match, the file can then be accessed by an end user (see FIG. 6) or, if there is a failure in verification, the file will be purged from the end user device's temporary memory 102 without the file ever having access to the end user's hard disk drive (e.g., the file is held remotely to the vulnerable portions of an end user device 100 until verification is complete).

Alternatively, the present system 10 may enable end users to still download a file even if the mismatch between hashes, etc. exists. In this embodiment, the system 10 would inform the end user of the mismatch and allow the end user to proceed with the download after the mismatch notification is displayed.

Figure 6:
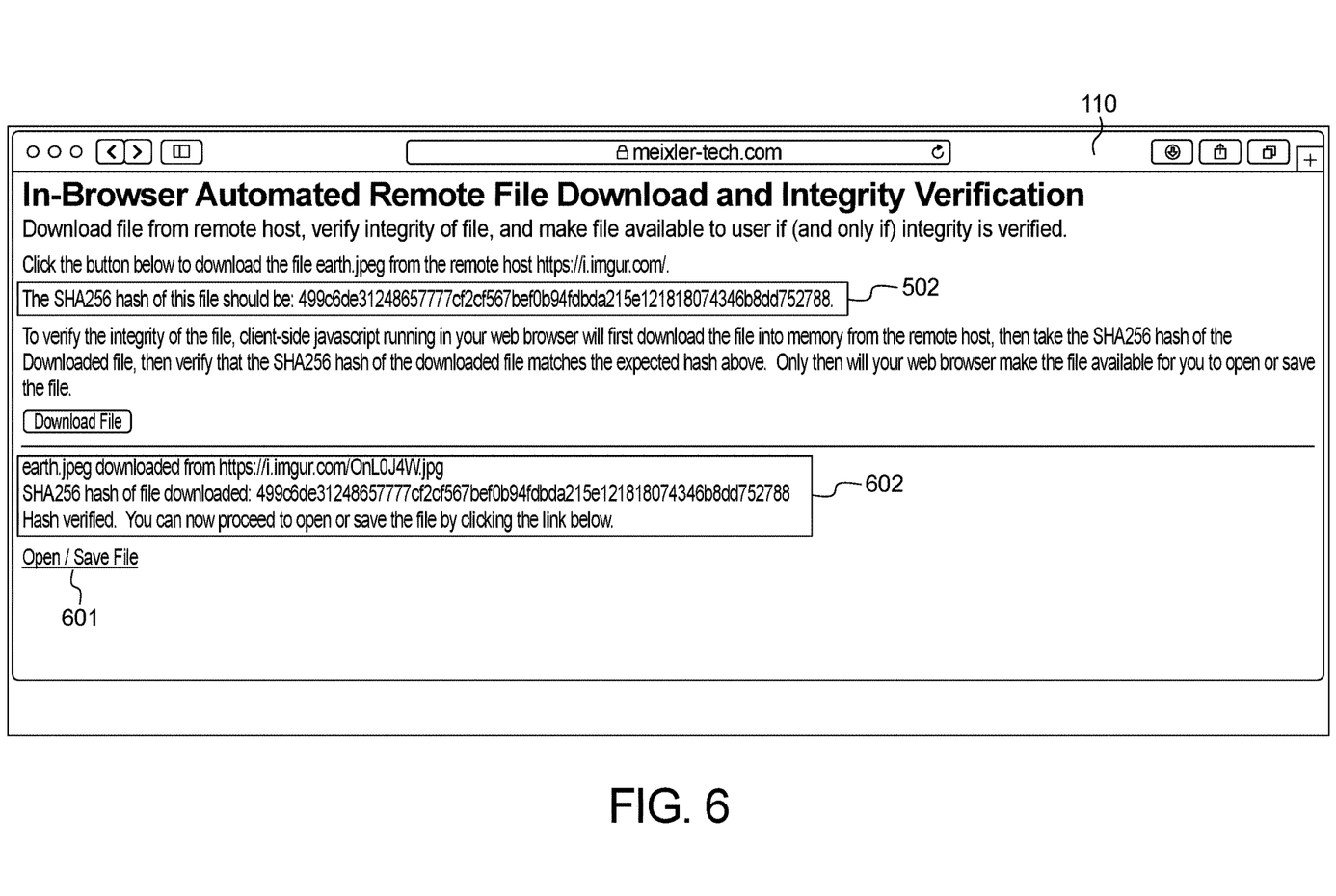
FIG. 6 is a download enabled webpage of the remote validation cybersecurity system.

FIG. 6 is a download enabled webpage of the remote validation cybersecurity system 10. As shown in FIG. 6, once an end user initializes the system 10 (see FIG. 5) it will download the requested file and verify its associated cryptographic values. In this example, the verification has been successful with a confirmation message 602 displayed for the end user. This confirmation message 602 may feature the one or more cryptographic values 502 verified by the system 10 to enable an end user to visually compare the values as well. End users are also provided with a download link 601 which will download and/or transfer the verified file from the temporary memory 102 to the permanent memory 104 (e.g., hard disk drive, cloud drive, etc.) of the end user device 100.

Figure 7:
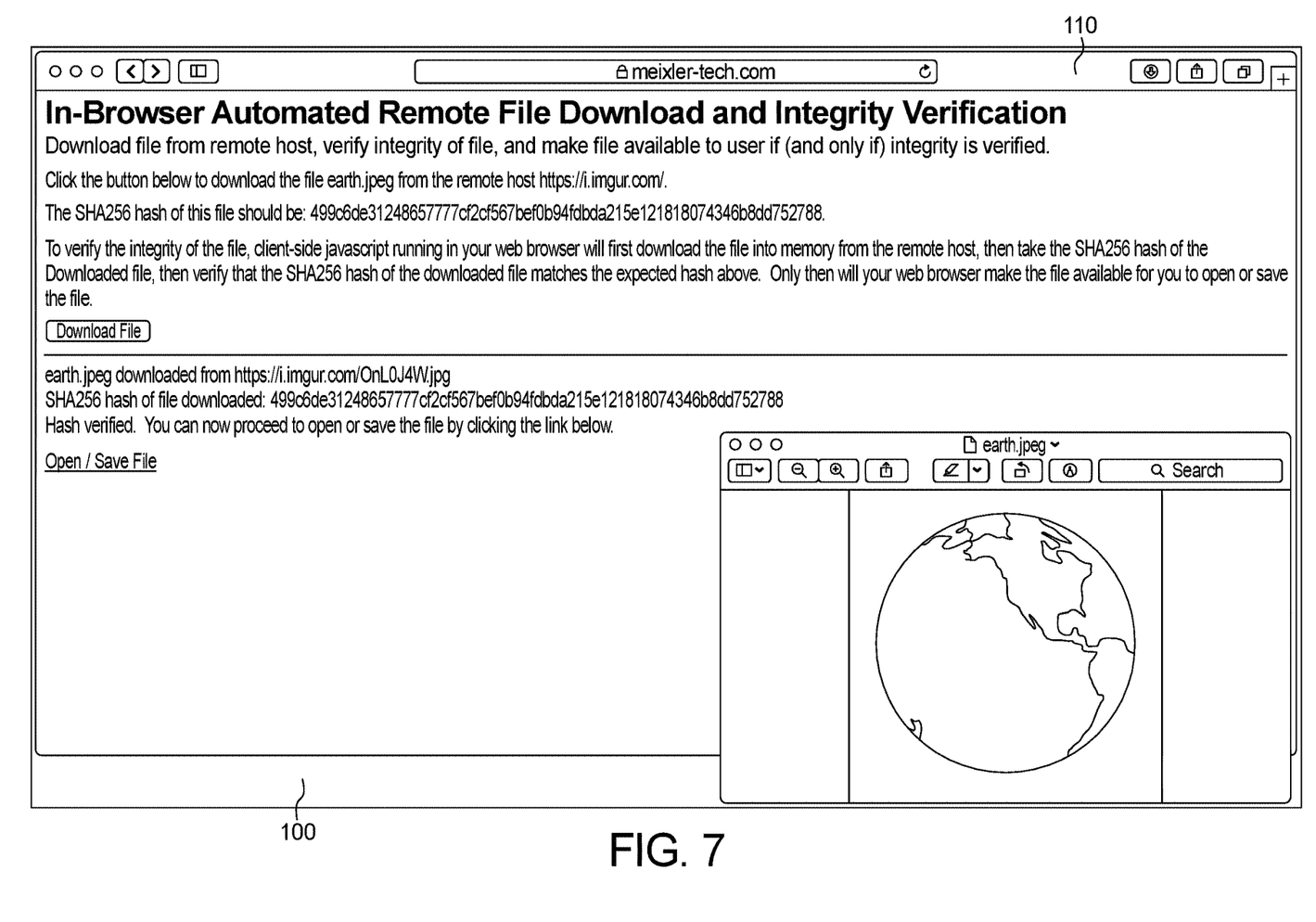
FIG. 7 is a verified file opened upon an end user device.

FIG. 7 is a verified file opened upon an end user device 100. As shown in FIG. 7, once a file has been verified by the system 10, it can be accessed upon the end user's device 100. In this case, a picture of the earth was downloaded from an external server 150. It should be noted that the present system may be integrated into a single webpage, web browser, but may also be integrated into various programs, applications, etc. running on a given end user device 100. For example, an email client may verify each of the cryptographic values associated with each email received by a given end user and/or verify the cryptographic values associated with each attachment to each email received.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A method of verifying the integrity of a downloadable file comprising the steps of:
    requesting a download of a file hosted by a first server via a download requesting device in communication with the first server, wherein the download requesting device includes a web browsing application through which the download is requested and a web-browser temporary memory;
    downloading the file into the web-browser temporary memory while preventing the file from being opened or executed by the download requesting device;
    within the web browsing application, analyzing the file to derive a cryptographic value of the file;
    within the web browsing application, comparing the derived cryptographic value of the file with a reference cryptographic value associated with the file hosted by a second server, wherein the download requesting device's access to the reference cryptographic value is not routed through the first server; and
    only when the derived cryptographic value of the file matches the reference cryptographic value associated with the file, enabling the file to be opened, executed, or saved by the download requesting device.

2. The method of claim 1, wherein the file is a web page.

3. The method of claim 1, wherein the file is an email.

4. The method of claim 1, wherein analyzing the file to derive a cryptographic value of the file includes deriving a cryptographic hash.

5. The method of claim 1, wherein analyzing the file to derive a cryptographic value of the file includes deriving a digital file signature.

6. The method of claim 1, wherein analyzing the file to derive a cryptographic value of the file includes analysis of a blockchain key.

7. The method of claim 1, wherein the steps of analyzing the file to derive a cryptographic value of the file and comparing the derived cryptographic value of the file with the reference cryptographic value are implemented by way of scripting provided by the second server.

8. The method of claim 1, wherein the steps of analyzing the file to derive a cryptographic value of the file and comparing the derived cryptographic value of the file with the reference cryptographic value are implemented by way of programming in the web-browsing application.

9. The method of claim 1, wherein when the derived cryptographic value of the file does not match the reference cryptographic value associated with the file, the file may still be opened, executed, or saved by the download requesting device only after a notification of the mismatch is displayed upon the download requesting device.

10. A system, comprising:
    an electronic device including a web browsing application through which the download is requested and a web-browser temporary memory; wherein
    in response to requesting a download of a file hosted by a first server via a download requesting device in communication with the first server, downloading the file into the web-browser temporary memory while preventing the file from being opened or executed by the download requesting device;
    within the web browsing application, analyzing the file to derive a cryptographic value of the file;
    within the web browsing application, comparing the derived cryptographic value of the file with a reference cryptographic value associated with the file hosted by a second server, wherein the download requesting device's access to the reference cryptographic value is not routed through the first server; and
    only when the derived cryptographic value of the file matches the reference cryptographic value associated with the file, enabling the file to be opened or executed by the download requesting device.

11. The system of claim 10, wherein the file is a web page.

12. The system of claim 10, wherein the file is an email.

13. The system of claim 10, wherein analyzing the file to derive a cryptographic value of the file includes deriving a cryptographic hash.

14. The system of claim 10, wherein analyzing the file to derive a cryptographic value of the file includes deriving a digital file signature.

15. The system of claim 10, wherein analyzing the file to derive a cryptographic value of the file includes analysis of a blockchain key.

16. The system of claim 10, wherein the steps of analyzing the file to derive a cryptographic value of the file and comparing the derived cryptographic value of the file with the reference cryptographic value are implemented by way of scripting provided by the second server.

17. The system of claim 10, wherein the steps of analyzing the file to derive a cryptographic value of the file and comparing the derived cryptographic value of the file with the reference cryptographic value are implemented by way of programming in the web-browsing application.

18. The method of claim 10, wherein when the derived cryptographic value of the file does not match the reference cryptographic value associated with the file, the file may still be opened, executed, or saved by the download requesting device only after a notification of the mismatch is displayed upon the download requesting device.

* * * * *